United States Patent
Eguchi et al.

(10) Patent No.: US 8,622,163 B2
(45) Date of Patent: Jan. 7, 2014

(54) SCOOTER TYPE MOTORCYCLE EQUIPPED WITH FUEL CELL SYSTEM

(75) Inventors: Toru Eguchi, Hamamatsu (JP); Kazuyuki Hirota, Hamamatsu (JP)

(73) Assignee: Suzuki Motor Corporation, Hamamatsu-Shi, Shizuoka-Ken (JP)

(*) Notice: Subject to any disclaimer, the term of this patent is extended or adjusted under 35 U.S.C. 154(b) by 486 days.

(21) Appl. No.: 12/782,139

(22) Filed: May 18, 2010

(65) Prior Publication Data
US 2010/0294582 A1 Nov. 25, 2010

(30) Foreign Application Priority Data

May 20, 2009 (JP) ................. 2009/122109

(51) Int. Cl.
*B60R 16/04* (2006.01)
*B60K 1/00* (2006.01)
*B62K 11/02* (2006.01)

(52) U.S. Cl.
USPC ........ 180/68.5; 180/65.31; 180/220; 280/835

(58) Field of Classification Search
USPC .............. 180/65.1, 65.21, 65.31, 68.5, 65.22; 280/835
See application file for complete search history.

(56) References Cited

U.S. PATENT DOCUMENTS

| | | | | |
|---|---|---|---|---|
| 4,800,980 A * | 1/1989 | Hideo et al. | ................. | 180/225 |
| 5,433,286 A * | 7/1995 | Kumamaru et al. | .......... | 180/219 |
| 6,349,785 B1 * | 2/2002 | Ohmika et al. | ............... | 180/227 |
| 6,889,788 B2 * | 5/2005 | Hakamata et al. | ............ | 180/219 |
| 2004/0108150 A1 * | 6/2004 | Guidry et al. | ................. | 180/65.3 |
| 2005/0019632 A1 * | 1/2005 | Horii et al. | ....................... | 429/26 |
| 2005/0051370 A1 * | 3/2005 | Horii | ............................ | 180/65.1 |
| 2005/0092538 A1 | 5/2005 | Baldwin et al. | | |
| 2006/0060400 A1 * | 3/2006 | Iwashita et al. | .............. | 180/65.3 |
| 2006/0251946 A1 * | 11/2006 | Makuta et al. | .................. | 429/34 |
| 2008/0093148 A1 * | 4/2008 | Takahashi | ..................... | 180/220 |
| 2008/0217087 A1 * | 9/2008 | Ito et al. | ......................... | 180/220 |
| 2009/0020347 A1 | 1/2009 | Horii et al. | | |
| 2010/0300785 A1 * | 12/2010 | Tamura | ........................ | 180/68.5 |

FOREIGN PATENT DOCUMENTS

| | | |
|---|---|---|
| EP | 1 319 590 | 6/2003 |
| EP | 1 914 158 | 4/2008 |
| JP | 2005-145359 A | 6/2005 |
| JP | 2007-099008 | 4/2007 |

(Continued)

OTHER PUBLICATIONS

European Search Report dated Aug. 27, 2010 for European Patent Application No. EP 10 16 3242.

*Primary Examiner* — Ruth Ilan
*Assistant Examiner* — Daniel Yeagley
(74) *Attorney, Agent, or Firm* — Barnes & Thornburg LLP (57) ABSTRACT

A scooter-type motorcycle is provided with a fuel cell system for driving the motorcycle by an electric power and includes: a vehicle body including a pair of left and right upper frames extending in a longitudinal direction of the vehicle body and a pair of left and right lower frames extending in the longitudinal direction of the vehicle body and having rear side end portions bent and connected to the respective upper frames; a fuel cell mounted on the vehicle body; a fuel tank connected to the fuel cell, in which the fuel tank is disposed in a center tunnel surrounded by the upper frames and the lower frames. A pair of left and right upper frames and a pair of left and right lower frames constitute a fuel tank supporting structure.

5 Claims, 8 Drawing Sheets

(56) References Cited

FOREIGN PATENT DOCUMENTS

| | | |
|---|---|---|
| JP | 2007-149606 A | 6/2007 |
| JP | 2008-247311 A | 10/2008 |
| JP | 2009-23556 A | 2/2009 |
| JP | 2009-93809 A | 4/2009 |
| JP | 2009078622 A * | 4/2009 |

* cited by examiner

SCOOTER TYPE MOTORCYCLE EQUIPPED WITH FUEL CELL SYSTEM

BACKGROUND OF THE INVENTION

1. Field of the Invention

The present invention relates to a scooter type motorcycle equipped with a fuel cell system, and more particularly, to scooter type motorcycle equipped with a fuel cell system and having a fuel tank supporting structure.

2. Related Art

A vehicle driven by a power of a fuel cell has been developed, which includes a fuel tank that stores a fuel, for example, hydrogen gas, a fuel cell stack (hereinafter, simply called a fuel cell) that generates electric power by chemical reaction of the fuel and air, i.e., oxygen in the air, a secondary cell, and a motor that drives a drive wheel.

In general, many conventional fuel cell systems for four-wheel vehicles generate relatively large electric power of several tens kW, and generate equivalent amounts of heat with power generation. Thus, the conventional fuel cell systems for four-wheel vehicles include water cooling type cooling units with high cooling efficiency. Further, in order to generate a large electric power, the conventional fuel cell system includes a compressor which feeds a large amount of air to the fuel cell system.

A scooter type motorcycle driven by an electric power of the fuel cell (which may be called hereinafter merely "scooter type fuel cell driven motorcycle", "fuel cell driven motorcycle", or merely "fuel cell motorcycle") as one example of the conventional fuel cell driven vehicle includes a water cooling fuel cell system capable of generating relatively large electric power. Such a scooter type fuel cell driven motorcycle includes: a radiator for cooling the fuel cell, which is disposed near to a front side of a vehicle main body; a cooling system which is disposed behind the radiator; a fuel cell disposed rearward of the cooling system and before a front end of a seat; and a fuel tank which is behind the fuel cell and substantially occupies a space under the seat. The cooling system thermally connects the radiator, the fuel cell and various electric components (for example, see Patent Document 1 (Japanese Patent Laid-Open No. 2007-99008)).

Meanwhile, an air cooling type fuel cell system generates relatively small electric power of several kW, but does not require a radiator, a cooling water pump, a reservoir tank, and piping which are included in the cooling system of a water cooling type fuel cell system, and can cool the heat generated with electric power generation with air as the reactant gas.

In addition, an air cooling type fuel cell system has low pressure loss in an air passage, and accordingly, an air cooling type fuel cell system has a simple system configuration in which a blower fan may suffice in place of a compressor, as an auxiliary machine to suppress the power consumption of the auxiliary machine to be low. Therefore, air cooling type fuel cell systems are utilized for the fuel cell driven vehicles such as fuel cell motorcycles capable of traveling with low output power as compared with four-wheel vehicles, and compact motor vehicles such as motor chairs.

Further, a fuel cell driven vehicle uses hydrogen gas as the fuel, and therefore, it is necessary to reliably protect a fuel tank from accidents such as overturning and collision for the sake of safeness.

However, in the conventional vehicle driven by the fuel cell, since a fuel tank is disposed in the space under the seat, it is difficult to say that the fuel tank can be protected in the accidents such as overturning and collision of the vehicle.

In addition, a conventional fuel cell vehicle mainly gives a weight to protection of the fuel tank, and if the fuel cell vehicle can sufficiently secure the storage amount of fuel in the fuel tank, it is difficult to sufficiently extend the cruising distance.

SUMMARY OF THE INVENTION

The present invention was conceived in consideration of the circumstances encountered in the prior art mentioned above, and an object thereof is to provide a scooter type motorcycle equipped with a fuel cell system as a prime mover and a fuel tank storing a fuel for generating electric power by the fuel cell system, as well as reliably protecting the fuel tank and sufficiently increasing a storage amount of the fuel tank.

The above and other objects can be achieved according to the present invention by providing a scooter-type motorcycle equipped with a fuel cell system, comprising:

a vehicle body including a pair of left and right upper frames extending in a longitudinal direction of the vehicle body and a pair of left and right lower frames extending in the longitudinal direction of the vehicle body and having rear side end portions bent and connected to the respective upper frames;

a fuel cell mounted on the vehicle body; and a fuel tank connected to the fuel cell, wherein the fuel tank is disposed in a center tunnel surrounded by the upper frames and the lower frames.

In a preferred embodiment of the above aspect, the fuel tank may be provided a fuel supply main valve at a rear end side of the center tunnel, and the vehicle body further includes a guard frame installed between the bent portions of the lower frames, the guard frame extending to a space formed below the fuel supply main valve. It may be desired that the bent portions of the lower frames are located at side portions of the fuel supply main valve. The guard frame may be provided with a support bracket for supporting a center stand which allows the vehicle body to stand alone.

The vehicle body may further include a clamp band for clamping the fuel tank, the clamp band being mounted between the upper frame located at a side surface of one side of the vehicle body and the lower frame located at a side surface of the other side of the vehicle body. The clamp band may include an upper half part and a lower half part fixed to the upper half part, the upper half part being disposed between the upper frame located at the side surface of one side of the vehicle body and the lower frame located at the side surface at the other side of the vehicle body.

It may be further desired that a pair of left and right upper frames and a pair of left and right lower frames constitute a fuel tank supporting structure.

According to the scooter type motorcycle equipped with a fuel cell system, the fuel tank in which a fuel for generating an electric power by the fuel cell is stored can be surely supported and protected with sufficiently increased storage amount of the fuel in the fuel tank.

The nature and further characteristic features of the present invention will be made clearer from the following descriptions made with reference to the accompanying drawings mentioned hereunder.

DESCRIPTION OF THE PREFERRED EMBODIMENT

Hereinafter, an embodiment of a scooter type motorcycle equipped with a fuel cell system according to the present invention including a fuel tank supporting structure will be described with reference to FIGS. 1 to 8. Further, it is to be noted that terms "upper", "lower", "right", "left" and other like terms are used herein with reference to the illustrations of the drawings or in an actual assembled state in a standing motorcycle.

Figure 1:
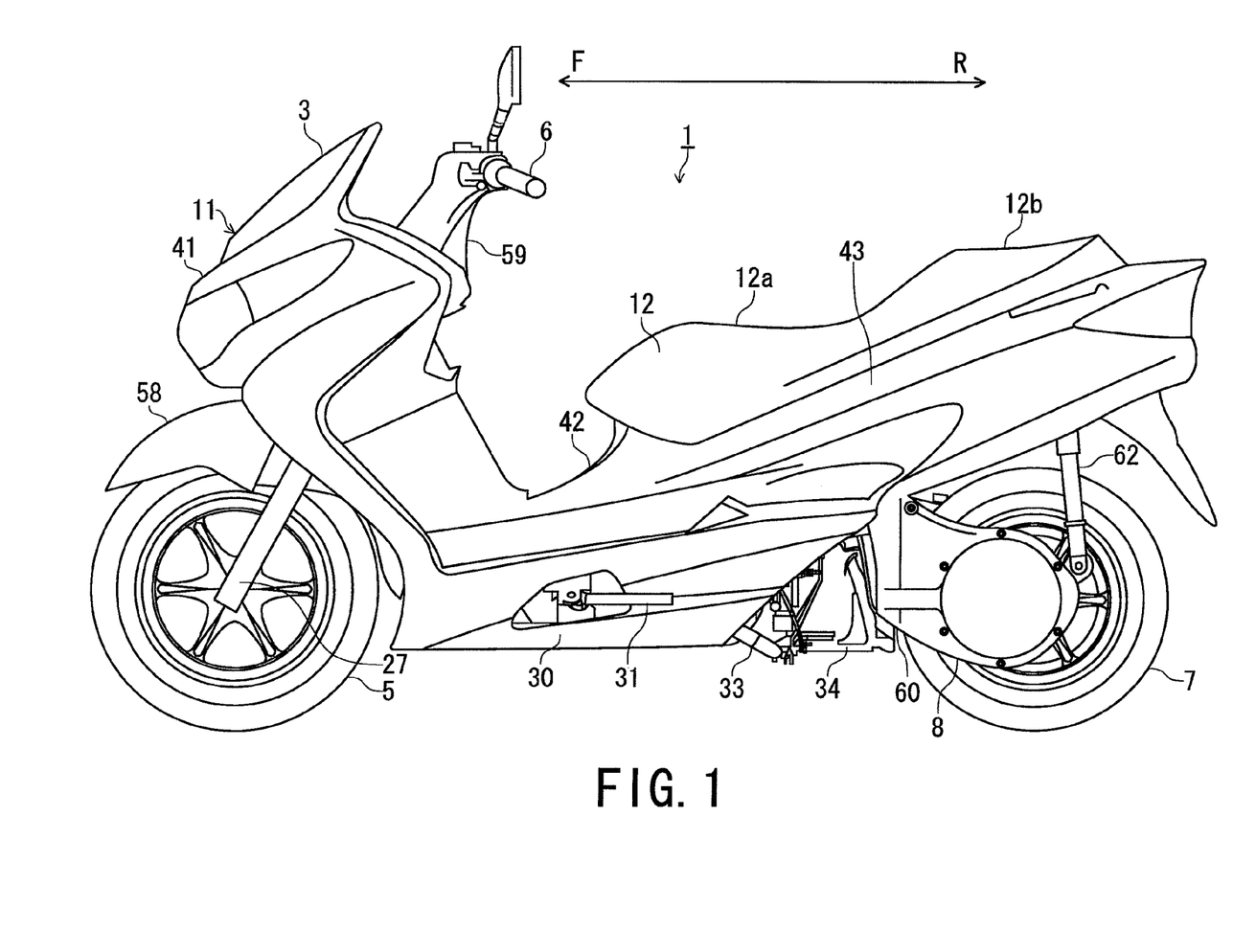
FIG. 1 is a left side view showing a scooter type motorcycle driven by an electric power generated by a fuel cell system and including a fuel tank supporting structure according to an embodiment of the present invention.
Figure 2:
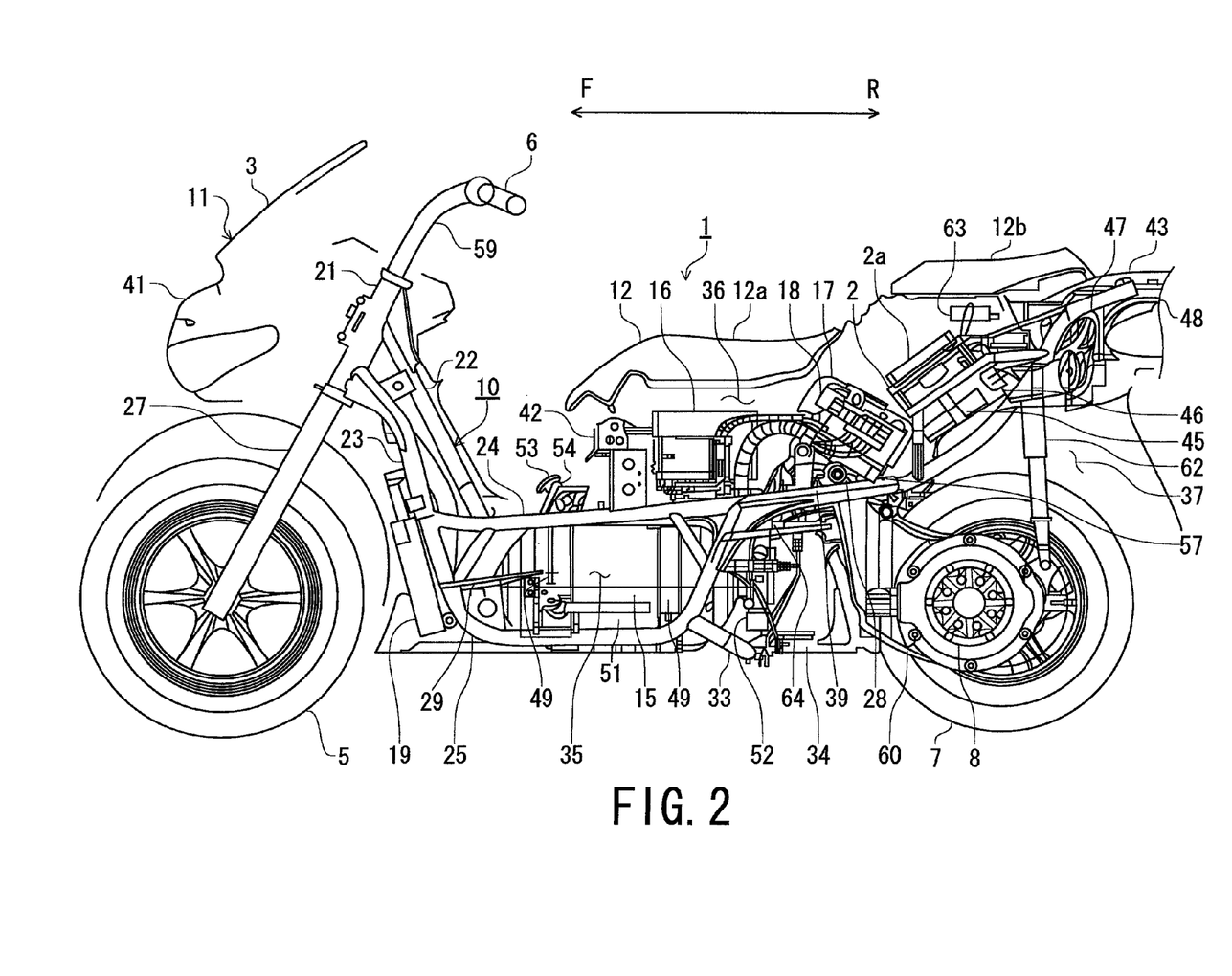
FIG. 2 is a left side view showing an interior of the scooter type motorcycle driven by the fuel cell system and including the fuel tank supporting structure according to the embodiment of the present invention.
Figure 3:
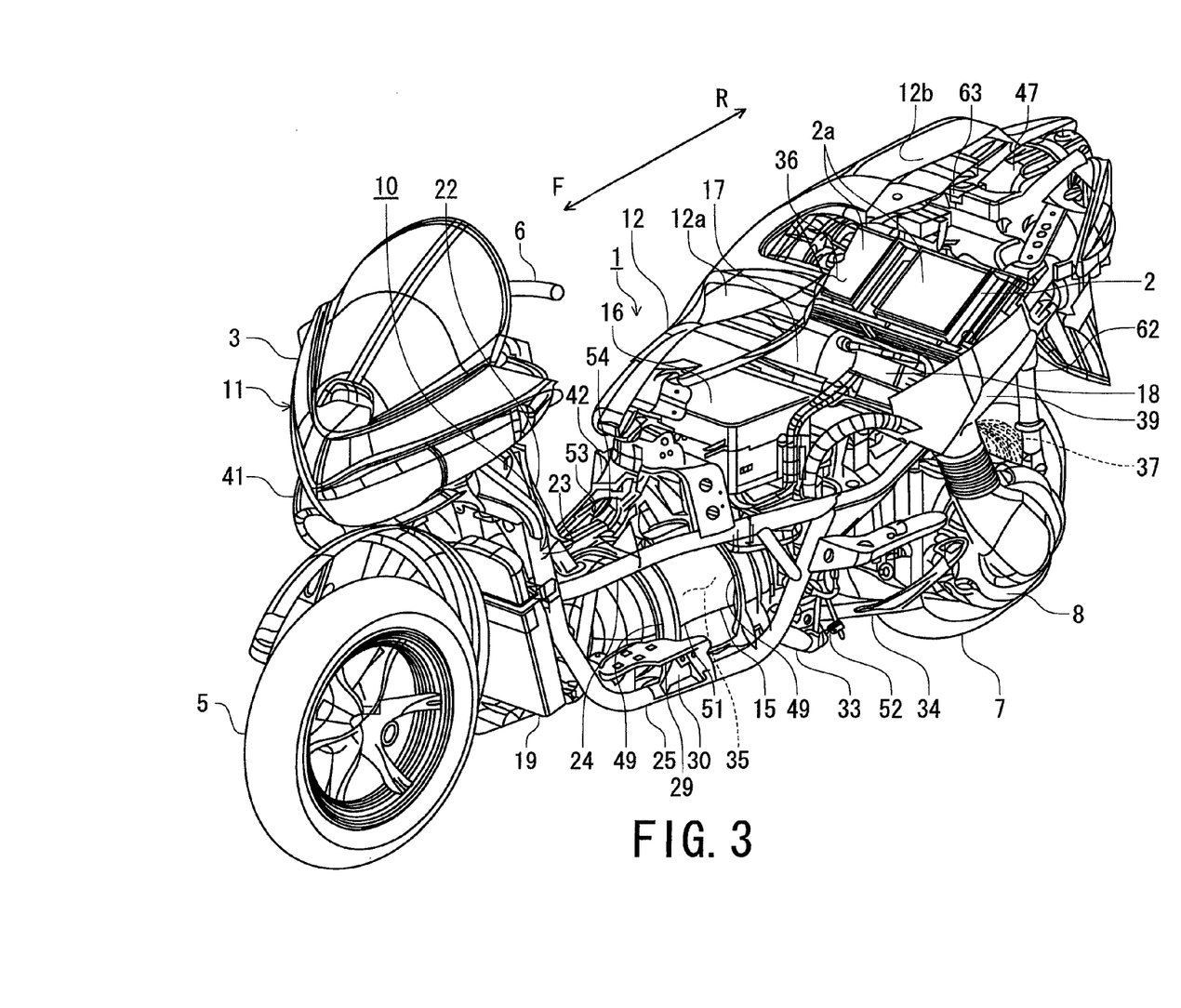
FIG. 3 is a perspective view showing the scooter type motorcycle driven by the fuel cell system and including the fuel tank supporting structure according to the embodiment of the present invention by partially removing an outer covering thereof.
Figure 4:
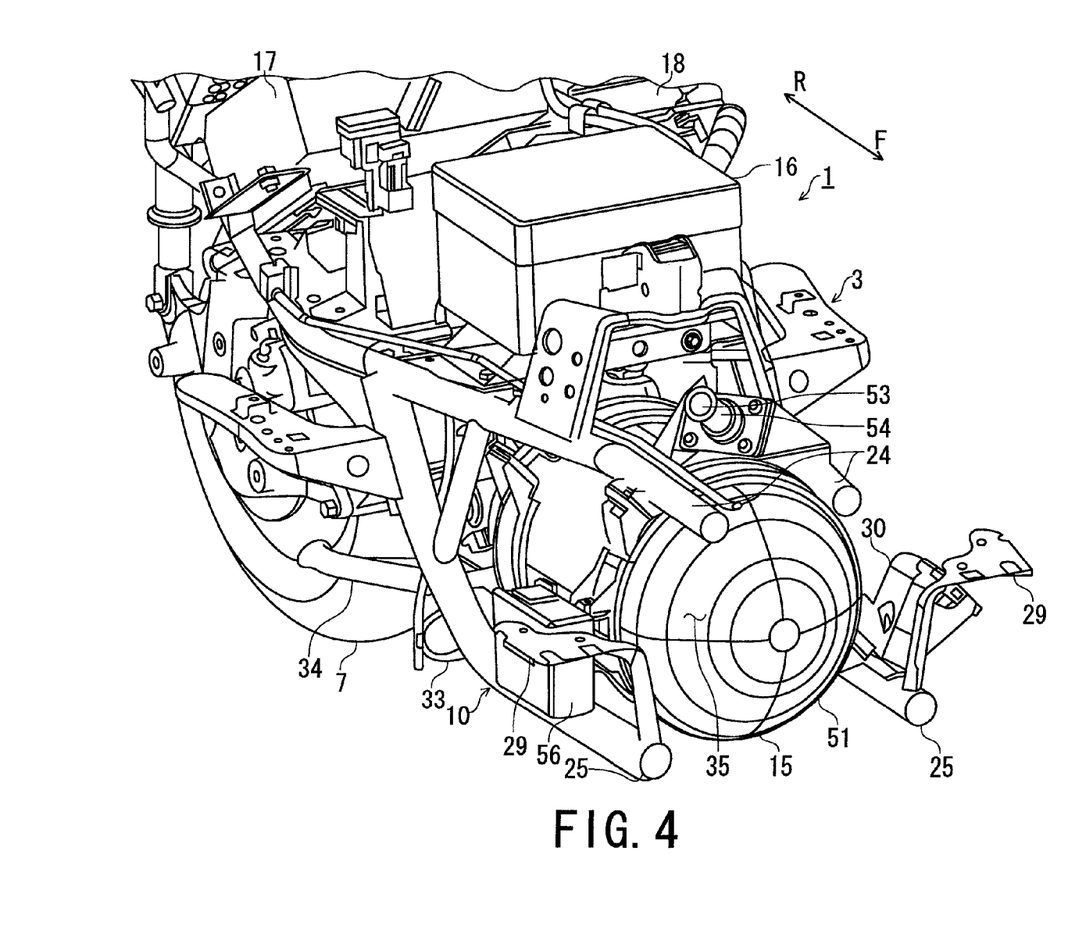
FIG. 4 is a perspective view partially showing a rear half part of the scooter type motorcycle driven by the fuel cell system, in an enlarged scale, according to the embodiment of the present invention shown in above FIGS. 1 to 3.

FIGS. 1 and 2 are left side views each showing the scooter type motorcycle driven by an electric power of a fuel cell system including a fuel cell and including a fuel tank supporting structure according to an embodiment of the present invention, in which FIG. 1 shown an entire outer configuration of the motorcycle and FIG. 2 shows an internal structure thereof by removing an outer cover or like members. FIG. 3 is a perspective view showing the scooter type motorcycle including the fuel tank supporting structure by partially removing the outer cover or like, and FIG. 4 is a perspective view partially showing a rear half part of the motorcycle of FIGS. 1 to 3.

To make the description easy, in figures, an arrow "F" is added to show a front side (forward) of the motorcycle and an arrow "R" is added to show a rear side (rearward) thereof.

Further, it is to be noted that, hereunder, the scooter-type motorcycle driven by an electric power and including a fuel tank supporting structure according to the present invention may be called "scooter-type motorcycle driven by a fuel cell system or merely "scooter-type fuel cell motorcycle".

As shown in FIGS. 1 to 4, the fuel cell vehicle (motorcycle) 1 according to the present embodiment is a motorcycle which includes a fuel cell 2 and travels by using electric power generated by the fuel cell 2. The scooter-type fuel cell motorcycle 1 includes a vehicle main body 3 (vehicle body), a front wheel 5 which is a steering wheel, a handle 6 which steers the front wheel 5, a rear wheel 7 which is a drive wheel, and a motor 8 which drives the rear wheel 7.

The fuel cell system of the present embodiment including the fuel cell 2 is an air cooling type fuel cell system using hydrogen gas as a fuel.

The vehicle (motorcycle) main body 3 includes a frame 10 which is a main structural member, an outer cover (exterior cover member) 11 by which the frame 10 is covered, and a seat 12 which is disposed above the frame 10. Further, the vehicle main body 3 includes the fuel cell 2, a fuel tank 15 which stores a fuel for use in electric power generation of the fuel cell 2, a secondary cell 16 which assists the power generation of the fuel cell 2, a power management device 17 which regulates an output voltage of the fuel cell 2 and performs power distribution control of the fuel cell 2 and the secondary cell 16, a motor controller 18 which converts DC power supplied from the power management device 17 into three-phase AC power, and performs operation control of the motor 8, and a vehicle controller 19 which performs total centralized control of these devices and performs operation control.

More specifically, a power train of the fuel cell motorcycle 1 is so-called a hybrid system having the fuel cell system (fuel cell 2) and the secondary cell 16.

The frame 10 includes a head pipe 21, a pair of left and right upper down frames 22 extending downward, a pair of left and right lower down frames 23 extending downward, a pair of left and right upper frames 24 and a pair of left and right lower frames 25, both extending substantially horizontally along a longitudinal direction of the vehicle body.

The head pipe 21 pivotally supports a front fork 27 at a forward portion of the vehicle main body 3.

The upper down frame 22 is connected to an upper portion of the head pipe 21 and is inclined downward rearward to the rear side of the vehicle main body 3.

The lower down frame 23 is extended substantially directly below from a lower portion of the head pipe 21.

The upper frame 24 is extended in the longitudinal direction of the vehicle main body 3 from a lower end of the lower down frame 23 through a lower end of the upper down frame 22 in a front half part of the vehicle main body 3, and is smoothly inclined upward rearward at the rear side of the vehicle main body 3 in a rear half part of the vehicle main body 3.

The seat 12 is disposed above a rear half part of the upper frame 24.

In addition, the upper frame 24 includes a pivot 28 in the rear half part of the vehicle main body 3.

The lower frame 25 is extended toward a lower side of the vehicle main body 3 from the lower end of the lower down frame 23, is bent at a position where it reaches a lower end of the vehicle main body 3, and extends in the longitudinal direction of the vehicle main body 3. The lower frame 25 is further bent at a position, where it reaches a central portion of the vehicle main body 3 and extends upward to the rear side of the vehicle main body 3, and is then connected to the upper frame 24.

Each of the lower frames 25 includes a foot rest 29 for a rider at a front side thereof. The lower frame 25 located at a left side of the vehicle main body 3 includes a side stand bracket 30. A side stand 31, which allows the motorcycle 1 to stand alone in a state tilted to the left side, is swingably attached to the side stand bracket 30.

The frame 10 also includes a guard frame 33 which is installed at the bent portions at the rear sides of the lower frames 25. A center stand 34, which allows the fuel cell driven motorcycle 1 to stand alone, is swingably provided for the guard frame 33. The guard frame 33 extends to a apace formed below a fuel supply main valve 52 (which may be called valve part 52).

By the frame 10 which is arranged and constituted as mentioned above, the vehicle main body 3 includes the fuel tank 15 in a center tunnel region 35 surrounded by a pair of the left and right upper frames 24 and a pair of the left and right lower frames 25, and includes the fuel cell 2, the secondary cell 16, the power management device 17 and the motor controller 18 in a device mounting region 36 (device mounting space) surrounded by the rear half part of the upper frame 24, the outer cover 11 and the seat 12.

In the device mounting region 36, the secondary cell 16, the power control device 17 and the fuel cell 2 are disposed in this sequence from the front side of the vehicle main body 3. The motor controller 18 is attached at a side of the power management device 17, for example, at a left side of the vehicle main body 3.

Further, the rear wheel 7 is disposed in a tire house region 37 which is behind the center tunnel region 35 of the frame 10 and under the device mounting region 36. Furthermore, a partition (bulkhead) wall member 39 which defines the respective regions is provided between the device mounting region 36 and the tire house region 37.

The outer cover 11 includes a front leg shield cover 41 which covers the front half part of the vehicle main body 3, a front frame cover 42 which is located at a central upper portion of the vehicle main body 3 and covers an upper side of the upper frame 24, and a frame cover 43 which is located at the rear half part of the vehicle main body 3 and covers a lower portion of the seat 12 of a side surface of the vehicle main body 3.

The frame cover 43 and the seat 12 define the device mounting region 36 which accommodates the fuel cell 2, the secondary cell 16, the power management device 17 and the motor controller 18. Accordingly, the device mounting region 36 is a sealed space enclosed by the seat 12, the frame cover 43 and the bulkhead member 39. By providing ventilation holes, not illustrated, in proper spots in the frame cover 43 or the bulkhead member 39, the flow of air as reactant gas, which is supplied to the fuel cell 2, can be easily and reliably controlled, and the flow of air as cooling air can also be easily and reliably controlled to the electric components to be cooled.

The device mounting region 36 does not have to be a completely hermetic space.

The seat 12 is mounted on the upper portion of the rear half part of the vehicle main body 3. The seat 12 is of a tandem type and includes a front part 12a on which a driver is seated and a rear part 12b on which a passenger is seated, both being integrally formed.

The fuel cell 2 is disposed to a rear side of the device mounting region 36 defined under the seat 12. More specifically, the fuel cell 2 is disposed below the rear part 12b of the seat 12 on which the passenger is seated. The fuel cell 2 is formed into a flat cube shape, and has an intake surface 2a, which has an inlet port of the reactant gas, oriented upward toward the front side of the vehicle main body 3 in a forward inclined manner. In concrete, the intake surface 2a of the fuel cell 2 is oriented to a step portion of the front part 12a and the rear part 12b of the seat 12, so that the fuel cell 2 secures a relatively large clearance between the intake surface 2a and the seat 12, thereby sufficiently in-taking atmosphere (air) of the device mounting region 36, as a reactant gas.

The fuel cell 2 is provided with a fan 45, which acts to intake the atmosphere (air) in the device mounting region 36 as the reactant gas from the intake surface 2a. The fuel cell 2 generates electric power by chemical reaction of the hydrogen gas supplied from the fuel tank 15 and oxygen contained in air, and thereafter, exhausts excessive humid gas from an exhaust port 46. In this process, the fuel cell 2 is cooled by the air as the reactant gas. The exhaust port 46 of the fuel cell 2 is communicated with an exhaust duct 47.

The exhaust duct 47 is disposed behind the fuel cell 2, and guides the exhaust gas of the fuel cell 2 to an exhaust port 48 opened at a rear end of the vehicle main body 3. The exhaust port 46 of the fuel cell 2 communicates with the exhaust duct 47 at a lower end portion of a front side of the exhaust duct 47, and the exhaust duct 47 has the exhaust port 48 at a location which is at an end portion of a rear side of the exhaust duct 47 and at an upper side from the communication position with the exhaust port 46 of the fuel cell 2, more desirably, at an upper end portion of the rear side. According to the location of the exhaust port 48 disposed at the upper side from the communication position with the exhaust port 46 of the fuel cell 2, the excessive humid gas containing unreacted hydrogen gas can be surely exhausted to the outside of the vehicle main body 3.

The fuel tank 15 stores hydrogen gas as the fuel for the fuel cell 2. The fuel tank 15 is, for example, a high-pressure compressed hydrogen storing system of about 35 MPa. The fuel tank 15 extends in the center tunnel region 35 in a substantially central lower portion of the vehicle main body 3 so that a longitudinal axis direction of the fuel tank 15 accords with the longitudinal direction of the vehicle main body 3. Accordingly, the periphery of the fuel tank 15 is surrounded by a pair of the upper frames 24 and a pair of the lower frames 25 to thereby securely protect the fuel tank 15 from the accidents such as overturning and collision of the fuel cell motorcycle 1. The fuel tank 15 is also sandwiched between the left and right foot rests 29 provided at the lower frames 25.

The fuel tank 15 is fixed into the center tunnel region 35 by the clamp band 49 which is arranged between the upper frame 24 disposed at the side portion at one side, for example, right side, of the vehicle main body 3 and the lower frame 25 disposed at the side portion, for example, at the left side of the vehicle main body 3. The clamp band 49 may be arranged between the upper frame 24 disposed at the left side of the vehicle main body 3, and the lower frame 25 disposed at the right side of the vehicle main body 3.

Further, the fuel tank 15 includes a pressure container 51 constituted of a composite container of an aluminum liner, the fuel supply main valve (valve part) 52 integrally having a main valve, not shown, using an electromagnetic valve and a regulator, not shown, and a fuel filling joint 54 having a fuel filling port 53. The pressure container 51 is a columnar container having semispherical mirror plates at both ends.

The fuel filling joint 54 communicates with the pressure container 51 so as to guide the hydrogen gas as a fuel into the pressure container 51 from the fuel filling port 53. The fuel filling port 53 is disposed to be sufficiently apart from the secondary cell 16. More specifically, the fuel filling port 53 is disposed in the vicinity of the upper down frame 22, outside the device mounting region 36 which accommodates a number of devices, and the fuel filling port 53 is covered with the front frame cover 42. More concretely, the fuel filling port 53 is disposed near above the mirror plate at the front side of the pressure container 51.

The fuel filling port 53 is oriented to an upper side of the vehicle main body 3. When it is required to supply the fuel into the fuel tank 15, the front frame cover 42 is opened to form an open space above the fuel filling port 53. Accordingly, even if the fuel leaks in the fuel filling operation, the leak fuel does not stay. Further, since the fuel filling port 53 is disposed at the same location as the fuel supply port in a scooter type motorcycle including an ordinary gasoline engine, an operator (rider) does not feel any sense of incompatibility.

The secondary cell 16 is constituted of a box-shaped lithium ion battery. The secondary cell 16 is disposed near the front side of the device mounting region 36 which is defined below the seat 12 and is disposed above the mirror plate at the rear side of the pressure container 51 of the fuel tank 15. More concretely, the secondary cell 16 is disposed under the front part 12a of the rider's seat 12 and is raised substantially upright on a phantom horizontal plane of the fuel cell motorcycle 1.

The fuel cell system motorcycle 1 includes a secondary cell 56 which can supply electric power of 12V system as a power supply for meters, not shown, and lamps, also not shown, in addition to the secondary cell 16. The secondary cell 56 is disposed at a side of the pressure container 51 of the fuel tank 15, for example, at a right side of the vehicle main body 3. The secondary cell 56 is disposed at a lower side from the fuel filling port 53, and at a front side of the vehicle main body 3 from the valve part 52 of the fuel tank 15.

Even if hydrogen gas which is a fuel leaks from the fuel filling port 53, the hydrogen gas rises upward from the fuel cell motorcycle 1, and therefore, diffuses outside the motorcycle without staying in the motorcycle body. Even if the fuel hydrogen gas leaks from the valve part 52, the hydrogen gas moves toward the tire house region 37, and therefore, the hydrogen gas diffuses outside the motorcycle without staying inside the motorcycle body.

The power management device 17 is disposed by being sandwiched by the secondary cell 16 and the fuel cell 2. The power management device 17 is held by being tilted rearward in the clearance between the secondary cell 16 and the fuel cell 2. The motor controller 18 which is provided side by side with the power management device 17 is also sandwiched by the secondary cell 16 and the fuel cell 2 and is held by being tilted rearward in the clearance between the secondary cell 16 and the fuel cell 2 similarly to the power management device 17.

As mentioned above, by disposing the secondary cell 16, the power management device 17, the motor controller 18 and the fuel cell 2, it becomes possible to locate the adjacent devices with electrical connections as closely as possible to each other. The wiring length between the devices can be made short, and the weight relating to the wiring can be made light.

The motor controller 18 is provided side by side with the power management device 17. Specifically, the motor controller 18 is disposed on the left side of the vehicle main body 3, whereas the power management device 17 is disposed on the right side of the vehicle main body 3. The motor controller 18 has a cooling fin 57 directed downward toward the lower side of the vehicle main body 3.

The vehicle controller 19 is disposed in front of the lower frame 25 so as to oppose to the mirror plate on the front side of the fuel tank 15.

Incidentally, the front wheel 5 is rotatably supported by the front fork 27, which is constituted so as to provide a stereoscopic structure elastically extendable and contractible, and which supports a front fender 58 above the front wheel 5. The handle 6 is connected to an upper end portion of the front fork 27. The front wheel 5, the front fork 27 and the handle 6 are supported swingably around the head pipe 21, and constitute a steering mechanism 59 of the fuel cell motorcycle 1.

The rear wheel 7 is rotatably supported by a swing arm 60 which is pivotally attached to a pivot 28 swingably. The swing arm 60 is elastically supported by the frame 10 via a rear suspension 62.

The motor 8 is a prime mover of the fuel cell motorcycle 1 which drives the rear wheel 7. The motor 8 is integrally mounted on the swing arm 60 and constitutes a unit swing type swing arm. The motor 8 is connected to the rear wheel 7 via a transmission, not illustrated. The drive force to be generated by the motor 8 will be transmitted to the rear wheel 7 through the transmission.

Further, the vehicle main body 3 includes fuel leakage detectors 63 and 64 which detect the leakage of the hydrogen gas as the fuel. The fuel leakage detectors 63 and 64 are constituted by using hydrogen gas detectors so as to detect the hydrogen gas. The fuel leakage detector 63 is disposed near the upper side of the device mounting region 36, that is, the inner space of the seat 12. The fuel leakage detector 64 is disposed at a position which is near to the upper side of a space near the valve part 52 of the fuel tank 15, of the center tunnel region 35, and is close to the tire house region 37. The hydrogen gas is lighter than the air, i.e., atmosphere, of the device mounting region 36 and the center tunnel region 35, and can be easily detected at the time of leakage of the hydrogen gas from the fuel cell 2, the fuel tank 15, and the intermediate pipe connecting the fuel tank 15 and the fuel cell 2. In particular, the device mounting region 36 is a sealed space, and when hydrogen gas, which is the fuel, leaks from the fuel cell 2, or the piping system, not illustrated, near the fuel cell 2, the leakage of the fuel can be quickly detected by the fuel leakage detector 63.

Further, when the hydrogen gas, which is the fuel, leaks from the vicinity of the valve part 52 of the fuel tank 15, the fuel leakage detector 64 can reliably detect the leakage of the fuel even under the situation in which the leakage fuel easily flows out to the tire house region 37 by traveling air or the like.

Figure 5:
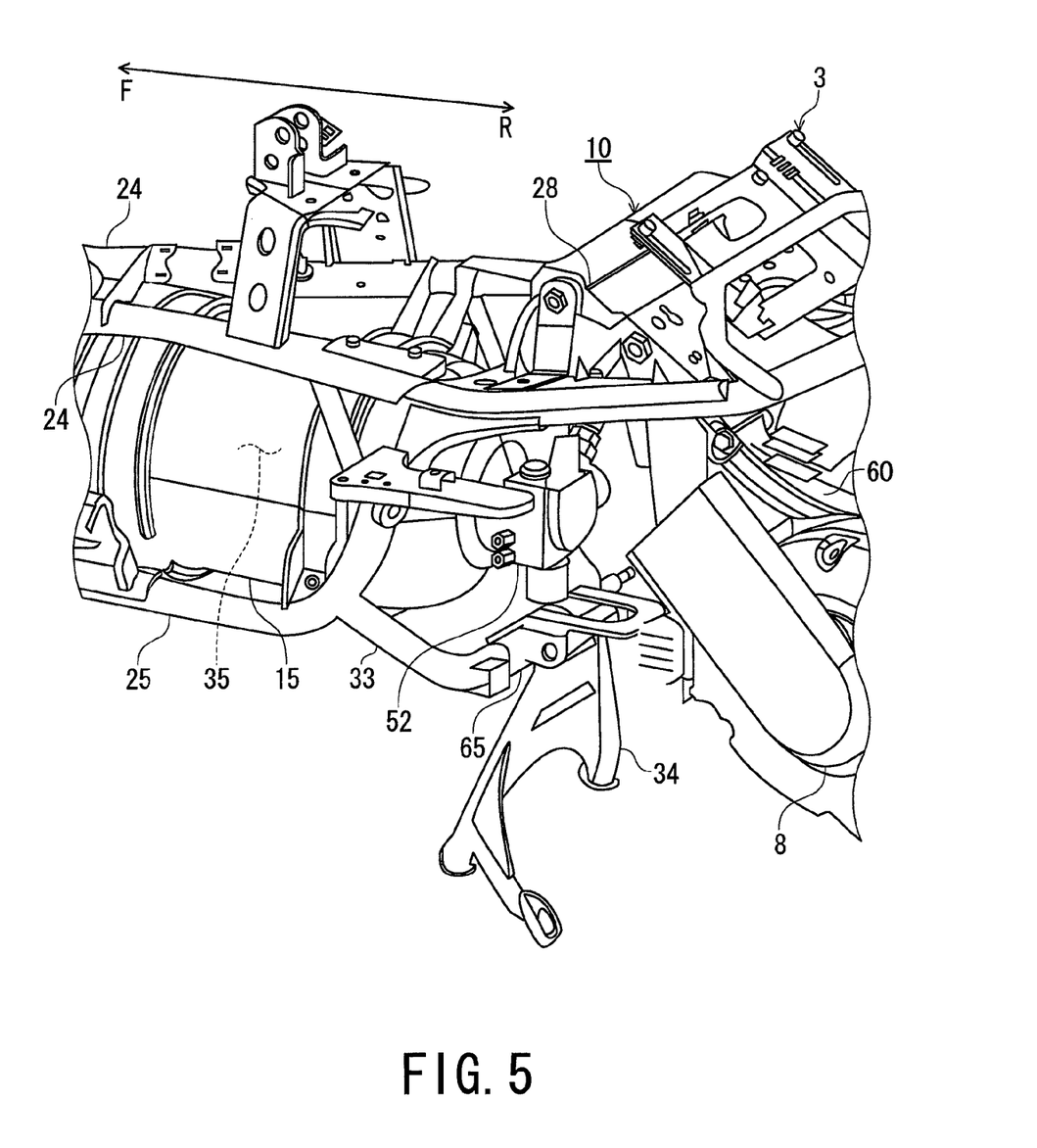
FIG. 5 is a perspective view partially showing a center tunnel region of the scooter type motorcycle driven by the fuel cell system, in an enlarged scale, according to the embodiment of the present invention shown in above FIGS. 1 to 3.

FIG. 5 is a perspective view partially showing the center tunnel region of the scooter type fuel cell driven motorcycle including the fuel tank supporting structure according to the embodiment of the present invention, in which the electric components such as the fuel cell 2, the secondary cell 16, the power management device 17 and the motor controller 18 are omitted from showing.

As shown in FIG. 5, the motorcycle 1 driven by the electric power of the fuel cell includes a pair of the left and right upper frames 24 extended in the longitudinal direction of the vehicle main body 3, a pair of the left and right lower frames 25 which extend in the longitudinal direction of the vehicle main body 3 and have their rear side end portions bent and connected to the respective upper frames 24, and the fuel tank 15 which is disposed in the center tunnel region 35 surrounded by the upper frame 24 and the lower frame 25.

The valve part 52 of the fuel tank 15 is located at the rear side of the center tunnel region 35.

The guard frame 33 is installed at the bent portions on the rear sides of the lower frames 25 and extends to a lower side from the valve part 52. Further, the guard frame 33 is provided with a center stand support bracket 65 at which the center stand 34 is swingably provided.

Accordingly, the fuel cell driven motorcycle 1 can securely protect the fuel tank 15 by a pair of left and right upper frames 24 and a pair of left and right lower frames 25, and the fuel tank 15 can secure a fuel storage amount as large as possible without limiting the longitudinal size of the pressure container 51 by the guard frame 33.

Further, the fuel cell driven motorcycle 1 can reliably protect the lower side of the valve part 52 by the guard frame 33, prevents scattering stones, bumps and dips on the road surface and the like from directly hitting or colliding to the valve part 52, and sufficiently protects the valve part 52 in which leakage of the fuel easily occurs because the valve part 52 has a number of joint portions in its construction.

Furthermore, the fuel cell driven motorcycle 1 has the structure in which the fuel tank 15 except for the lower side of the valve part 52 can be directly seen from the lower side of the vehicle main body 3, and therefore, the fuel tank 15 can be easily disposed in the center tunnel region 35 from the lower side thereof, thus improving the maintainability of the motorcycle 1.

The guard frame 33 includes the center stand 34, and therefore, a considerable bending load acts on the connecting portion with the lower frame 25, that is, the base portion of the guard frame 33, each time when the fuel cell motorcycle 1 is caused to stand alone. Therefore, when the storage amount of the fuel tank 15 is further increased, and longitudinal size thereof is further enlarged, if the guard frame 33 extends to be longer, it becomes difficult to secure the strength of the base portion of the guard frame 33.

In order to obviate this defect, another example of the fuel tank supporting structure in the case of further increasing the storage amount of the fuel tank 15 will be described with reference to FIG. 6, for example.

Figure 6:
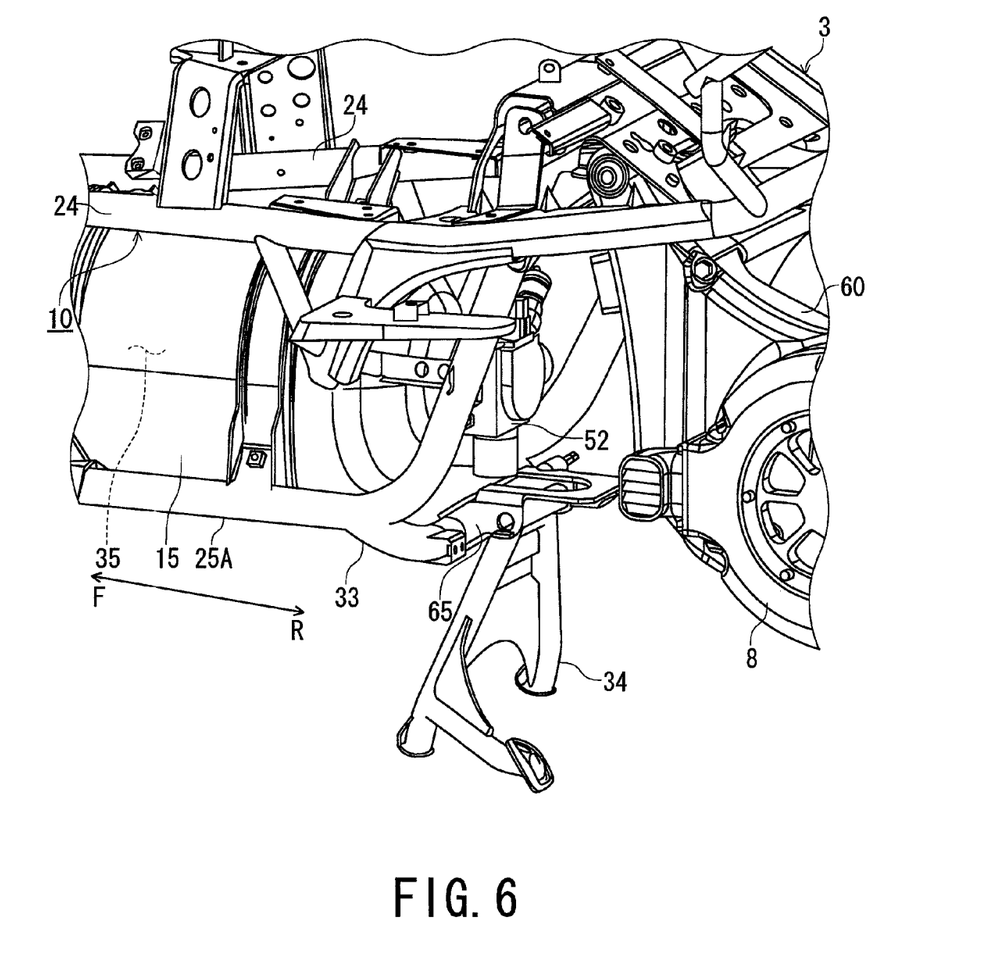
FIG. 6 is a perspective view partially showing another example of the center tunnel region of the scooter type motorcycle driven by the fuel cell system according to the embodiment of the present invention shown in above FIGS. 1 to 3.

FIG. 6 is a perspective view partially showing another example of the center tunnel region of the scooter type motorcycle driven by the fuel cell and including the fuel tank supporting structure according to the embodiment of the present invention, and in FIG. 6, the electric components such as the fuel cell 2, the secondary cell 16, the power control device 17 and the motor controller 18 are omitted.

With reference to FIG. 6, a lower frame 25A of the fuel cell driven motorcycle 1 extends in the longitudinal direction of the vehicle main body 3 along the substantially entire length of the fuel tank 15, and the bent portion thereof is located on a side of the valve part 52 of the fuel tank 15. Accordingly, the lower frame 25A can protect the side of the valve part 52 with the bent portion to the raised portion connected to the upper frame 24.

In the fuel cell driven motorcycle 1 of this embodiment, the length of the portion of the lower frame 25A, which extends in the longitudinal direction of the vehicle main body 3 so as to locate the raised portion of the lower frame 25A at the side of the valve part 52, is increased (i.e., extended). According to this structure, the fuel tank 15 can be protected, and a larger storage amount of the fuel can be secured. Moreover, compatible, and also protects the lower side of the valve part 52 can be also protected, and the strength of the guard frame 33 as the supporting structure of the center stand 34 can be secured.

Figure 7:
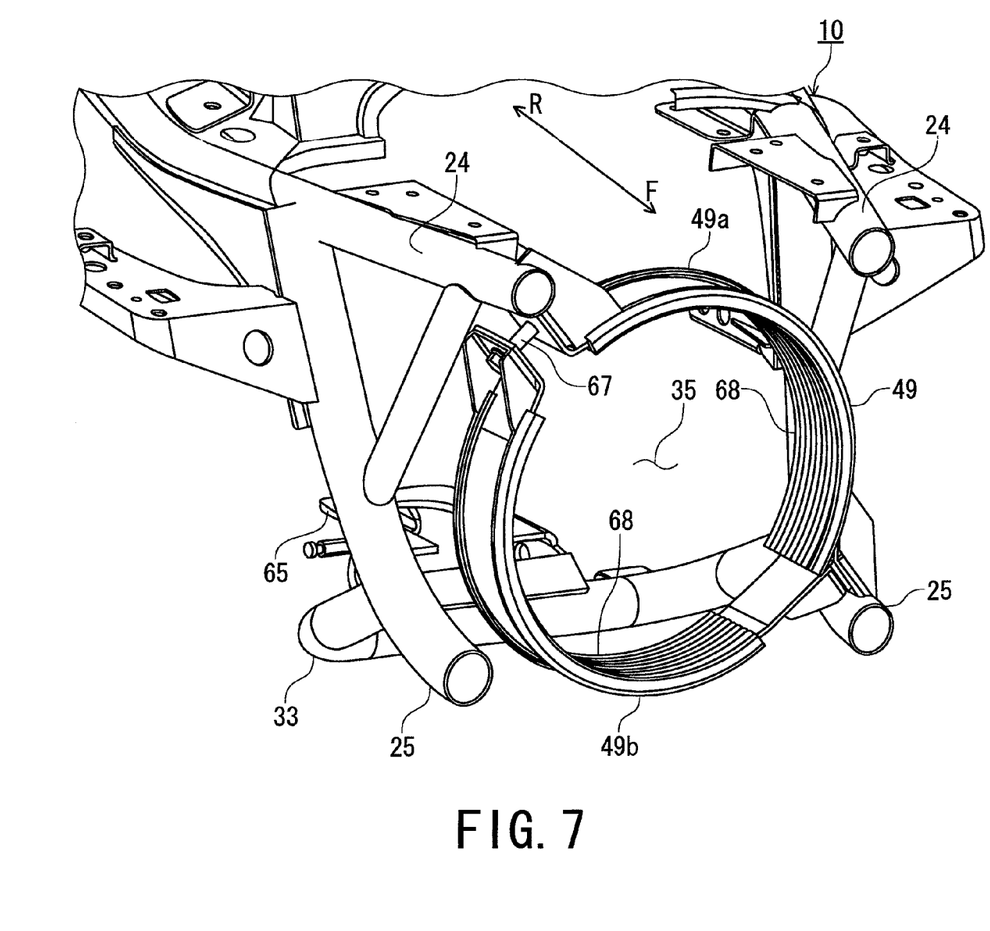
FIG. 7 is a perspective view showing a clamp band of the scooter type motorcycle driven by the fuel cell system, in an enlarged scale, according to the embodiment of the present invention shown in above FIGS. 1 to 3.

FIG. 7 is a perspective view showing a clamp band of the scooter type fuel cell driven motorcycle including the fuel tank supporting structure according to the embodiment of the present invention. FIG. 7 is a view mainly showing the frame 10 and the clamp band 49.

As shown in FIG. 7, the clamp band 49 includes a semicircular upper half part 49a, and a semicircular lower half part 49b fixed to the upper half part 49a. The upper half part 49a is positioned between the upper frame 24 disposed at one side portion of the vehicle main body 3 (for example, the upper frame 24 disposed on the right side of the vehicle main body 3), and the lower frame 25 disposed at the other side portion of the vehicle main body 3 (for example, the lower frame 25 disposed at the left side of the vehicle main body 3).

The clamp band 49 includes a fixed end at which the upper half part 49a and the lower half part 49b are fixed with a fastening member, not shown, a clearance formed by cutting away parts of circular-arc portions of the respective upper and lower half parts 49a and 49b, and an adjustment end disposed so as to adjust the clearance amount by a fastening member 67.

Elastic members 68 of rubber silicon or the like may be provided on the inner circumferential surfaces of the upper half part 49a and the lower half part 49b of the clamp band 49.

For the arrangement of the clamp band 49, the upper half part 49a is first fixed to the frame 10. Then, the fuel tank 15 is disposed so that the outer peripheral portion thereof abuts against the inner circumferential portion of the upper half part 49a. Next, the lower half part 49b is disposed so that the inner circumferential portion thereof abuts against the outer peripheral portion of the fuel tank 15, and the fixed ends of the upper half part 49a and the lower half part 49b are fixed with the fastening member. Finally, the fuel tank 15 is suitably fastened, while fastening the adjustment ends of the upper half part 49a and the lower half part 49b with the fastening member 67.

As mentioned above, according to the scooter-type motorcycle equipped with the fuel cell system and the fuel tank supporting structure of the present embodiment, the fuel tank 15 disposed in the center tunnel region 35 can be easily attached and detached, thus providing extremely high maintainability.

Figure 8:
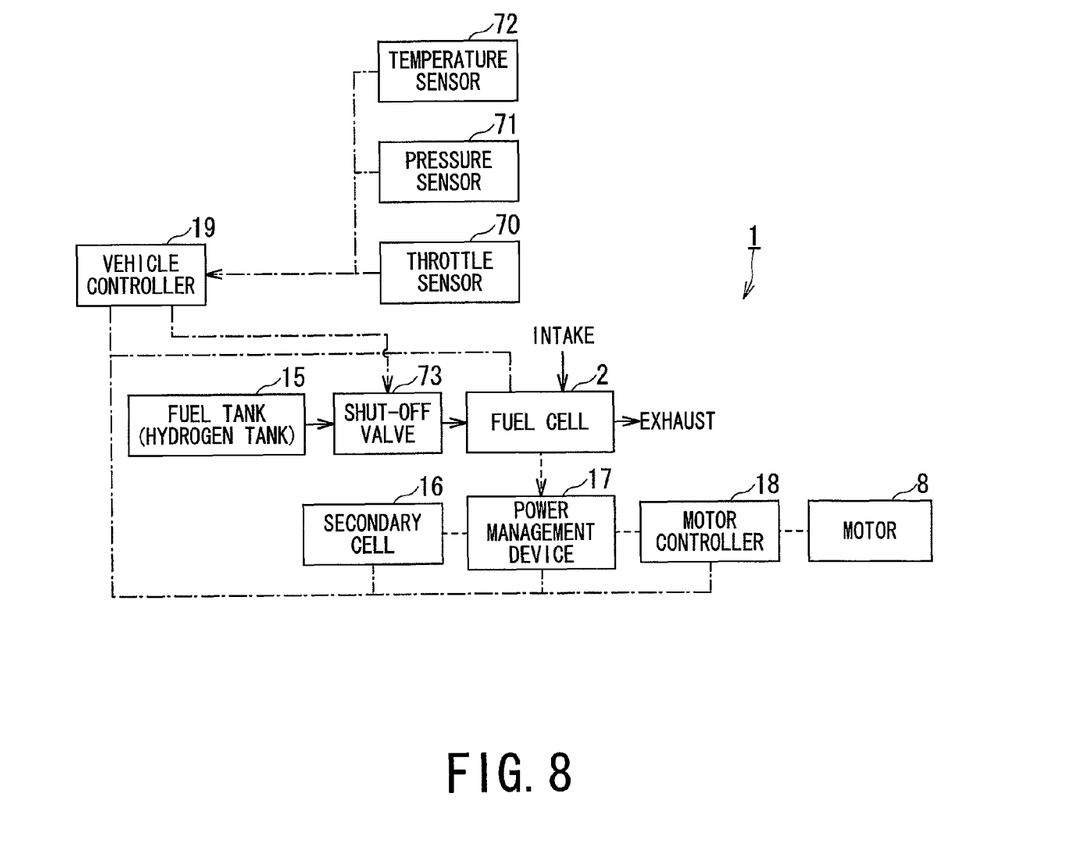
FIG. 8 is a block diagram showing main devices or equipments of the scooter type motorcycle driven by the fuel cell system according to the embodiment of the present invention described above.

FIG. 8 is a block diagram showing main equipments or devices of the scooter type motorcycle equipped with the fuel cell system according to the embodiment of the present invention.

As shown in FIG. 8, the motorcycle 1 includes the fuel cell system including the fuel cell 2, the motor 8, the fuel tank 15, the secondary cell 16, the power management device 17, the motor controller 18 and the vehicle controller 19, and also includes a throttle sensor 70 in which an intention to accelerate of the rider is inputted, a pressure sensor 71 which detects the pressure of the fuel supplied to the fuel cell 2 from the fuel tank 15, a temperature sensor 72 which detects the temperature of the fuel supplied to the fuel cell 2 from the fuel tank 15, and a shut-off valve 73 which shuts off the fuel supplied to the fuel cell 2 from the fuel tank 15 at the time of detecting fuel leakage.

In FIG. 8, the solid arrow indicates the flow of the hydrogen gas which is the fuel and air as the reactant gas, the broken line, or the broken arrow indicates the flow of electric power, and the dashed line, or the dashed line arrow indicates the flow of the control signal, and the line segments represent bi-directional flows.

The power management device 17 manages and controls the generated electric power of the fuel cell 2, converts the electric power fed from the fuel cell 2 and the secondary cell 16 into a power supply of 12V and stores the power in the secondary cell 56.

The motor controller 18 performs regenerative control of converting negative torque which occurs to the motor 8 at the time of deceleration of the fuel cell motorcycle 1 and at the time of downhill traveling into electric power, in addition to the drive control of the motor 8.

The vehicle controller 19 receives, as inputs, the accelerator operating amount by the rider detected by the throttle sensor 70, and the detection values of the pressure sensor 71 and the temperature sensor 72, and inputs the state amounts and outputs control signals bi-directionally to and from the fuel cell 2, the secondary cell 16, the power management device 17 and the motor controller 18 so as to perform operation control of the fuel cell driven motorcycle 1.

More specifically, at a cruising time and at a time of traveling on a flat road at which energy necessary for the fuel cell driven motorcycle 1 to travel is relatively small, the vehicle controller 19 supplies the electric power generated by the fuel cell 2 to the motor 8 via the motor controller 18 from the power management device 17, and supplies the electric power to the secondary cell 16 from the power management device 17 to store excessive electric power which is not needed for driving the motor 8 in the secondary cell 16.

On the other hand, at an accelerating time when the energy necessary for the fuel cell driven motorcycle 1 to travel is relatively large or at a time of uphill traveling, the vehicle controller 19 supplies the electric power generated by the fuel cell 2 to the motor 8 via the motor controller 18 from the power management device 17, and also supplies the electric power stored in the secondary cell 16 to the motor 8 via the motor controller 18 from the power management device 17.

Further, at a decelerating time or at a time of downhill travelling, the vehicle controller 19 uses the motor 8 as the generator, and supplies the regenerative electric power generated by the motor 8 to the secondary cell 16 from the power management device 17 and stores the regenerative electric power.

In the thus constituted scooter-type fuel cell driven motorcycle 1 having the fuel tank supporting structure, the fuel tank 15 is disposed in the center tunnel region 35, and the fuel tank 15 is surrounded by a pair of the upper frames 24 and a pair of the lower frames 25 to be thereby securely protected.

The fuel cell driven motorcycle 1 according to the present embodiment can secure a storage amount as large as possible in the fuel tank 15 without limiting the longitudinal size of the pressure container 51 of the fuel tank 15.

Further, in the fuel cell driven motorcycle 1 according to the present embodiment, the lower side of the valve part 52 is reliably protected by the guard frame 33 and the valve part 52, in which leakage of the fuel easily occurs for the structural reason, can be sufficiently protected.

Furthermore, in the fuel cell driven motorcycle 1 according to the present embodiment, the fuel tank 15 can be easily disposed in the center tunnel region 35 from the lower side of the vehicle main body 3, thus enhancing the maintainability thereof.

Still furthermore, according to the fuel cell driven motorcycle 1, the fuel tank 15 can be properly protected and a larger storage amount can be secured by the lower frame 25A. The lower side of the valve part 52 can be also protected, and the strength of the guard frame 33 as the supporting structure of the center stand 34 can be also secured.

Furthermore according to the fuel cell motorcycle 1, it is possible for the fuel tank 15 disposed in the center tunnel region 35 to be easily attached and detached, thus achieving high maintainability.

As mentioned hereinbefore, according to the fuel tank supporting structure of the scooter type motorcycle driven by the electric power of the fuel cell (fuel cell driven motorcycle) of the present invention, the fuel cell 2 as the prime mover, and the fuel tank 15 storing the fuel for use in electric power generation of the fuel cell 2 are provided, whereby the fuel tank 15 can be reliably protected, and the storage amount of the fuel tank 15 can be sufficiently increased, thus being advantageous.

It is to be further noted that the present invention is not limited to the described embodiment and many other changes and modifications may be made without departing from the scope of the appended claims.

What is claimed is:

1. A scooter-type motorcycle equipped with a fuel cell system, comprising:
    a vehicle body including a pair of left and right upper frames extending in a longitudinal direction of the vehicle body and a pair of left and right lower frames extending in the longitudinal direction of the vehicle body and having rear side end portions bent and connected to the respective upper frames;
    a fuel cell mounted on the vehicle body; and
    a fuel tank connected to the fuel cell, the fuel tank being disposed in a center tunnel surrounded by four frames including the pair of left and right upper frames and the pair of left and right lower frames,
    wherein the vehicle body further includes a clamp band for clamping the fuel tank, the clamp band being mounted between the upper frame located at a side surface of one side of the vehicle body and the lower frame located at a side surface of the other side of the vehicle body, and
    wherein the clamp band comprises an upper half part and a lower half part fixed to the upper half part, the upper half part being fixed to a portion between the upper frame located at the side surface of one side of the vehicle body and the lower frame located at the side surface at the other side of the vehicle body.

2. The scooter-type motorcycle equipped with the fuel cell system according to claim 1, wherein the fuel tank is provided a fuel supply main valve at a rear end side of the center tunnel, and the vehicle body further includes a guard frame installed between the bent portions of the lower frames, the guard frame extending to a space formed below the fuel supply main valve.

3. The scooter-type motorcycle equipped with the fuel cell system according to claim 2, wherein the bent portions of the lower frames are located at side portions of the fuel supply main valve.

4. The scooter-type motorcycle equipped with the fuel cell system according to claim 2, wherein the guard frame is provided with a support bracket for supporting a center stand which allows the vehicle body to stand alone.

5. The scooter-type motorcycle equipped with the fuel cell system according to claim 1, wherein a pair of left and right upper frames and a pair of left and right lower frames constitute a fuel tank supporting structure.

* * * * *